United States Patent Office 2,759,817

Patented Aug. 21, 1956

2,759,817

LIGHT-SENSITIVE MATERIAL FOR PHOTO-MECHANICAL REPRODUCTION

Maximilian Paul Schmidt and Oskar Süs, Wiesbaden-Biebrich, Germany, assignors, by mesne assignments, to Azoplate Corporation, Summit, N. J., a corporation of New Jersey No Drawing. Application August 5, 1952, Serial No. 302,810

Claims priority, application Germany August 8, 1951

12 Claims. (Cl. 95—7)

The present invention relates to the field of photomechanical reproduction. More particularly it relates to a new light-sensitive material suitable for the manufacture of printing plates and stencils by photomechanically transposing onto said material the image of an original intended for duplication and to the development of said material after exposure.

Today, the production of printing plates by photomechanical processes, in particular of printing plates for use in lithography and offset printing, may involve the use of light-sensitive diazo compounds. The aromatic diazo compounds are primarily suited for this purpose and among them there have been known for some time the so-called tanning diazo compounds which when added to colloidal layers, have a hardening effect on the colloidal substances at those places where they are exposed to the action of light rays and transformed into light decomposition products in consequence of the radiation. Diazo layers, free of colloids, have also become known recently, which may be applied to suitable base materials to form printing plates subsequent to their exposure and development. Such layers, however, have failed to gain practical importance due to their limited stability in unexposed condition. Printing plates of this kind, moreover, yield only a limited number of prints.

It has now been found that light-sensitive material of which the light-sensitive layer contains imino-quinone diazides as light-sensitive substances, which conform to the following general formulae:

I.

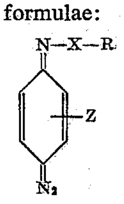

wherein:

R stands for aryl
X stands for $SO_2$ or CO
Z stands for alkyl or halogen,

II.

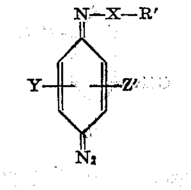

wherein:

R′ stands for aryl or alkyl
X stands for $SO_2$ or CO
Y stands for alkoxy or alkyl
Z′ stands for alkyl, halogen or alkoxy,

III.

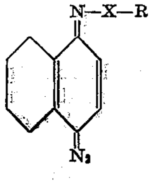

wherein:

R stands for aryl
X stands for $SO_2$ or CO, and

IV.

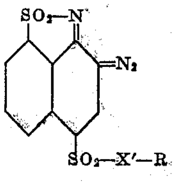

wherein:

R stands for aryl
X′ stands for O, N-alkyl, NH.

Where the term "aryl" is used, it is understood to include within its scope both substituted as well as unsubstituted aryl which are excellently suited for photomechanical reproduction purposes. They are hard to dissolve in water or are entirely insoluble, however they dissolve in organic solvents.

The imino-quinone diazides of the benzene series and of the naphthalene series conforming to the above mentioned general formula are primarily suited for use as light-sensitive substances according to this invention. The quinoidal nucleus containing the diazide group and the aromatic residue of the acyl group linked to the nitrogen atom of the imino group, both, may be substituted. The introduction of substituents may improve the usefulness of the diazo compounds in question. Among the imino-quinone diazides of the benzene series, derivatives of the p-imino-benzo-quinone diazide containing as substituents in the quinoidal nucleus alkoxy groups which are in a p-position to one another and moreover having the hydrogen atom of the imino group substituted by an aryl-sulfonyl residue, have proven especially well suited for the production of light-sensitive material that shows great stability in storage. In the naphthalene series, excellent results are obtained by the use of derivatives of imino-(1)-naphthoquinone-diazide-(2) having in the 4-position as substituent a sulfonamide group or a sulfonic acid ester group, in which derivatives, moreover, the hydrogen atom of the imino group is replaced by a sulfonyl group that is simultaneously linked to the aromatic ring of the naphthalene nucleus. These compounds, therefore, derive from 2-amino-1,8-naphsultams bearing the substituents described above. They are obtained by diazotizing 2-amino-1,8-naphsultams.

The following table contains data identifying more specifically some of the imino-quinone diazides to be employed in accordance with this invention. The formulae are presumed to be accurate representations of these diazides.

1.

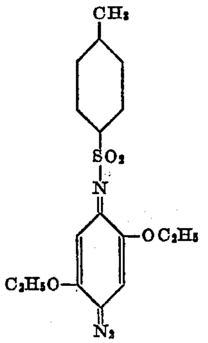

Dark orange flakes. Melting point, 120°–121° C. under decomposition (from dioxane); melting point of the amino compound 132° C. (from alcohol).

2.

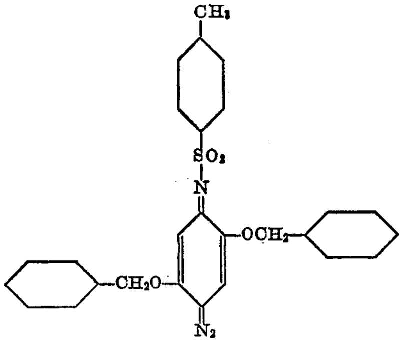

Yellow crystals. Melting point, 133°–135° C. under decomposition; melting point of the amino compound 149°–150° C. (from dilute alcohol).

3.

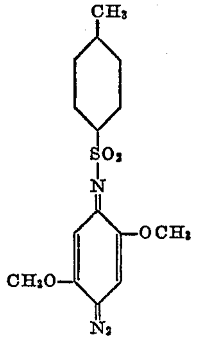

Red-brown crystals. Melting point, 135°–137° C. under decomposition; melting point of the amino compound 148° C. (from dioxane-water).

4.

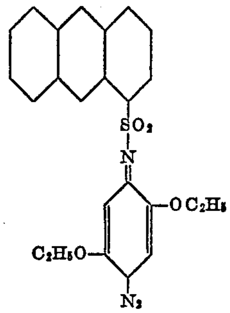

Light brown crystals. Melting point, 148°–154° C. under decomposition; melting point of the amino compound 243°–244° C. (from alcohol).

5.

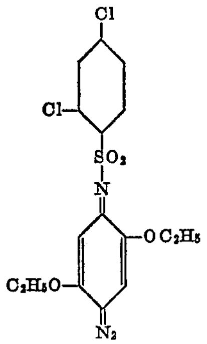

Yellow crystals. Melting point 124°–126° C. under decomposition; melting point of the amino compound 156°–157° C. (from dioxane-water).

6.

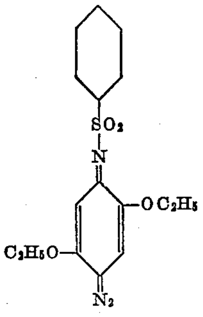

Brownish-yellow crystals. Melting point 121°–124° C. under decomposition; melting point of the amino compound 110°–111° C. (from alcohol).

7.

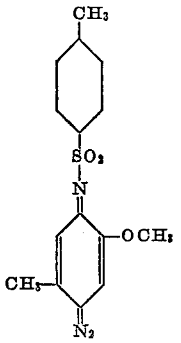

Red-brown scales. Melting 123° C. spontaneous decomposition; melting point of the amino compound 165° C. (from alcohol).

8.

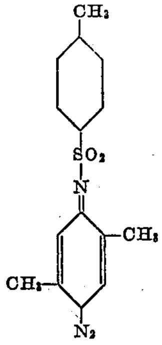

Orange-yellow crystals. Melting point 141° C. under decomposition; melting point of the amino compound 185° C. (from alcohol).

9.

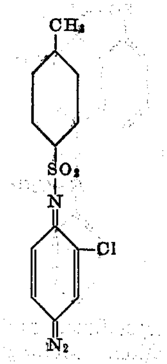

Greenish-yellow crystals. Melting point 173°–175° C. under decomposition; melting point of the amino compound 167° C. (from alcohol).

10.

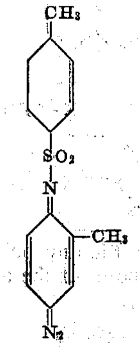

Light yellow crystals. Melting point, 161°–162° C. under decomposition; melting point of the amino compound 151° C. (from alcohol).

11.

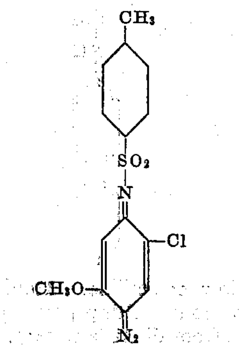

Lemon-yellow scales. Melting point, 164°–166° C. under decomposition; melting point of the acetamino compound 198°–199° C.

12.

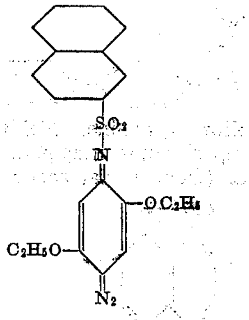

Brown crystals. Melting point 115°–116° C. under decomposition (from dioxane); melting point of the amino compound 121°–122° C. (from dioxane water).

13.

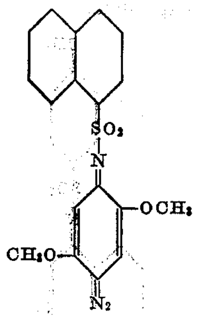

Yellow crystalline. Melting point 139°–142° C. under decomposition; melting point of the amino compound 143°–144° C. (from dilute alcohol).

14.

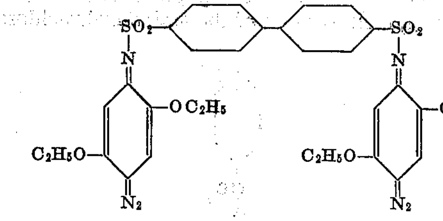

Brownish-yellow crystals, slowly decomposing at 185° C.; melting point of the amino compound 206°–207° C. (from glacial acetic acid).

15.

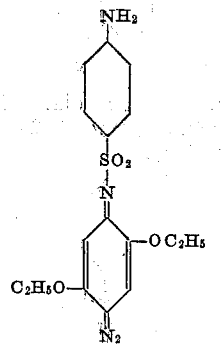

Light yellow crystals. Melting point 140°–141° C. under decomposition; melting point of the acetamino compound 198° C. (from alcohol).

16.

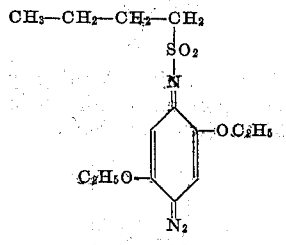

Light yellow crystals. Melting point 80°–85° C.; melting point of the amino compound 95°–96° C. (from acetic acid).

17.

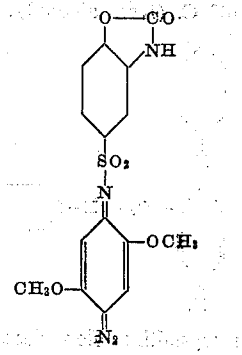

Small golden-yellow, glossy crystals. Melting point 145° C. under decomposition.

18.

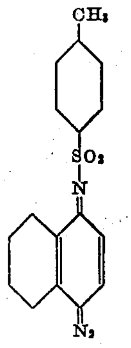

Golden yellow scales. Melting point 160°–162° C. while charring; melting point of the amino-hydro-chloride 217° C.

19.

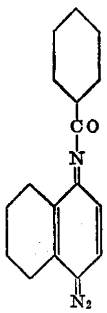

Brown crystals. Melting point 123°–124° C. under decomposition; melting point of the amino compound 187° C. (from alcohol).

20.

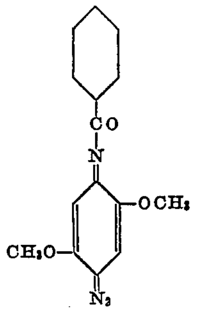

Greenish-yellow crystals. Melting point 155° C., spontaneous decomposition; melting point of the amino compound 166° C. (from alcohol).

21.

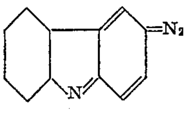

Orange-red needles. Melting point 80°–90° C., decomposition at 95° C.; melting point of the amino compound 246°–248° C. (from alcohol).

22.

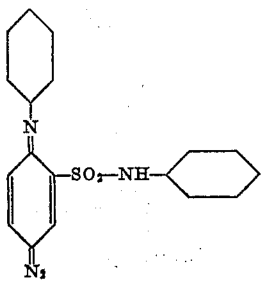

Dark brown crystalline, slow decomposition at 145° C. Melting point of the amino compound 213° C. (from glacial acetic acid).

23.

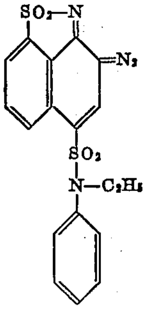

Brownish-yellow crystalline. Melting point 175°–182° C. under decomposition. Melting point of the amino compound 101° C. (from acetic acid).

24.

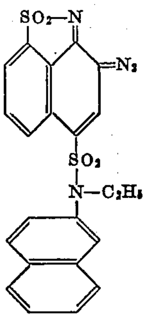

Yellow crystalline. Melting point 205° C. under decomposition; melting point of the amino compound 141° C. (from acetic acid).

25.

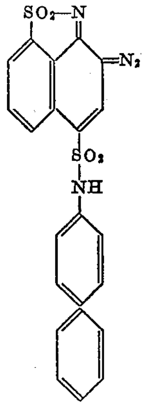

Brownish-yellow crystalline. Melting point 215° C. under decomposition; melting point of the amino compound 185° C. (from dioxane-water).

26.

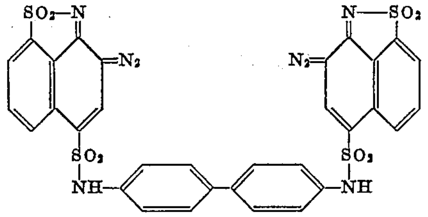

Brownish-yellow crystalline. Melting point 205°–210° C. under decomposition; melting point of the amino compound 266° C. (from glacial acetic acid).

27.

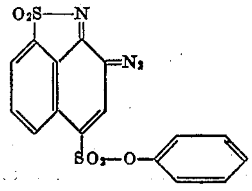

The imino-quinone diazides to be employed in accordance with this invention are applied to a suitable base by processes customary in reproduction work in the form of their solutions in organic solvents, preferably in solvents whose boiling points are between 70° and 120° C. In drying, this material forms a uniform, thin light-sensitive layer on the surface of the base. The formation of the layer can be favorably influenced by the addition of resins in small quantities; this method simultaneously results in the light-sensitive layer adhering more firmly to the base material, in particular when the latter is of metal.

Metals, like aluminum and zinc, are especially well suited to serve as base material. Material containing cellulose, e. g. paper, as well as glass or lithographic stone are other suitable bases.

Owing to the fact that imino-quinone diazides show a strong tendency to crystallize, it proves expedient in many instances to add substances that prevent crystallization to the sensitizing solutions intended for coating. The above mentioned resins are effective substances of that kind. Prevention of crystallization is also achieved by employing mixtures of the imino-quinone diazides.

Well-known methods are followed in producing images with the light-sensitive material built up in accordance with this invention. The diazo compound is destroyed in the places affected by light when the sensitized foils are exposed under a transparent pattern. In respect to solubility in dilute alkalies, dilute acids and organic solvents, the light transformation product differs considerably from the diazo compound remaining in those places that were not affected by light. The methods of developing the exposed material in order to get the finished image of the pattern are based on this difference in solubility.

Both the imino-quinone diazides and their light decomposition products are oleophilic and capable of accepting greasy ink. Depending on the diazo compound used, it is possible, in consequence, to produce images, in particular printing plates, that are either negative or positive relative to the pattern employed. Negative images of positive originals are obtained, if the diazo compound is removed by the development with the above-mentioned agents while the light decomposition product remains. Positive images of positive patterns result, when the diazo compound remains on the base and forms the substance of the image.

The development of the image can be carried out by wiping over the image side of the exposed material with a cotton swab moistened with the above-mentioned dilute acids, dilute alkalis, or organic solvents. The organic solvents may also be mixed with water. It may be expedient to bathe the exposed material in the above-named agent for the purpose of developing the image.

As the light decomposition products of imino-quinone diazides are less basic than the diazo compounds, negative images are obtained on developing the exposed material by an acid agent, because the diazo compound only is removed by dissolution from the surface of the base, if a weak concentration of the acid agent is used. The light decomposition product remains unchanged by a weak acid agent.

If basic residues are present in the molecule of the diazo compound, the difference in solubility in aqueous acid agents which is obtained between the diazo compound itself and its light-decomposition product is further increased whereby the development of the exposed layer to the finished image is facilitated.

The production of negative images from positive masters by means of dilute alakline solutions also depends on the fact that the light-decomposition products of the imino-quinone diazides here in question in general are more difficultly soluble in dilute alkalies than the diazo compounds themselves. This relation between diazo compound and its light-decomposition product becomes predominant with the paraiminoquinone diazides of the benzene series substituted by arylsulfonyl groups. Contrary to the compounds just mentioned of the benzene series the iminoquinone diazides of the naphthalene series having the constitution of 1,8-naphsultams and substituted at the carbon atom in 4-position by a sulfonamide group or an esterified sulfo group lead to positive images, if the light-sensitive layer containing these iminoquinone diazides is exposed to light under a positive master and subsequently developed by means of an alkaline agent. The light-decomposition products of this group of iminoquinone diazides dissolve more readily in dilute alkalies than the diazo compounds themselves.

With respect to the organic solvents, the solubility of most of the iminoquinone diazides here in question is greater than that of their light-decomposition products. This circumstance can also be made use of in the development of an image obtained by exposing a layer sensitized by an iminoquinone diazide to light under a master. If a positive master is used and the exposed layer is developed by means of an organic solvent a negative image will be obtained. The degree of solubility of the iminoquinone diazides, however, in organic solvents is different. Therefore it is necessary to find out the specific organic solvent, which is best suited for development of an exposed layer containing a special iminoquinone diazide and its light-decomposition product. Advantageously an organic solvent is used as developer which does not readily dissolve the diazo compound at normal temperature. Otherwise the light-decomposition product may also be partly dissolved by the organic solvent which would lead to a deterioration of the image. If it is nevertheless desired to have at one's disposal an organic solvent which may be used for the development of a number of iminodiazides, this can be achieved by mixing the solvent with water or with another solvent, in which the iminodiazides or the specific iminodiazide present in the exposed layer are insoluble.

In order to obtain good water carrying power by the metal background when a metallic base is used, the developed image may be lightly etched with dilute acid and coated with greasy ink.

In order to be better able to observe the formation of the image during the developing process, it may prove expedient in some instances to add dyes to the sensitizing solution used for the production of the light-sensitive material. It is a remarkable fact that these dyes will remain intact within the image areas during the developing process while they are removed in all non-image areas.

In producing the imino-quinone diazides to be used in accordance with this invention, some of which have already been described, the known methods of preparative organic chemistry can be employed. The p-amino-diazonium salts arylated or acylated within the amino group, which may be obtained as intermediate products during the process are converted into the respective imino-quinone diazides by a treatment with basic substances, such as sodium acetate, for example compare Holzach "Die aromatischen Diazoverbindungen" (the aromatic diazo compounds) (1947), pages 96 and 97.

The following examples are inserted in order to illustrate the present invention. The parts indicated in the examples are by weight if not otherwise stated.

(1) One part of the diazo compound conforming to the Formula 1 is dissolved in hundred parts by volume of glycol-monomethyl ether and the solution is applied by whirlcoating to the roughened surface of an aluminum foil. This layer is dried first in a current of hot air, and then the foil is heated to a temperature of approximately 90° C. for about five minutes in order to completely remove the solvent. The sensitized material is exposed under a transparent pattern to the light emitted by an arc lamp, and the resulting image is developed by wiping the exposed layer with a one percent solution of trisodium phosphate. The developed foil is wiped with a one percent solution of phosphoric acid, the image thus becoming clearly invisible upon the metallic background.

From a negative pattern there is obtained a slightly greenish-yellow positive image which eventually can be inked with greasy ink and be used as printing plate.

In place of the diazo compound named above, the diazo compounds conforming to the Formulas 2, 3 or 4 can be employed with equally good results in sensitizing the foils. When developing the images produced by means of these diazo compounds, it proves expedient to vary the developing method described above.

In the case of the diazo compound conforming to the Formula 2, a developing solution derived from fifty parts of calcium chloride, 130 parts by volume of ethyl alcohol, thirty parts by volume of water, and ten parts by volume of triethanolamine can be used to advantage.

Best suited for devolping in the case of the diazo compound conforming to the Formula 3 is a three-percent solution of trisodium phosphate.

Images produced by means of the diazo compound conforming to the Formula 4 are developed by being wiped for some time with ethylene glycol.

The diazo compound with the Formula 1, N-(4′-methyl-benzene-1′-sulfonyl) - imino - (1) - 2,5-diethoxy-benzo-quinone-(1,4)-diazide-(4), is produced as follows:

By the condensation of equimolecular quantities of 2-amino-hydroquinone-diethyl-ether and of p-toluene-sulfochloride in an inert solvent (dioxane, benzene) in the presence of pyridine, p-toluene - sulfonyl - amide - 2,5-diethoxy-benzene is obtained, melting, subsequent to its recrystallization from dilute alcohol, at a temperature of 132° to 133° C. This compound is then nitrated with 1.1 mol of concentrated nitric acid ($d$=1.52) in glacial acetic acid at 35° to 40° C. and yields p-toluene-sulfonyl-amino-4-nitro-2,5-diethoxy-benzene (after recrystallization from glacial acetic acid, melting point 190° to 191° C.) from which p-toluene-sulfonyl-amino-(1)-4-amino-2,5-diethoxy-benzene is obtained by catalytic reduction with hydrogen and colloidal nickel in alcoholic solution at a temperature of from 60° to 80° C. The diazotization of this compound is effected with sodium nitrite at room temperature in a solution of hydrochloric acid in the presence of dioxane. The solution of the diazonium salt is diluted with the double volume of water and filtrated with charcoal. The imino-quinone diazide is precipitated from the diazonium solution by the addition of sodium acetate. The quinone diazide precipitates in the form of golden yellow crystals. The diazo compounds conforming to the Formulas 2, 3 and 4 are produced analogously.

(2) A paper foil of the kind produced in accordance with the American Patent No. 2,534,588, one side of the paper foil being coated with a layer consisting of casein and clay and hardened by means of formaldehyde, is coated on its layer side with a one-percent solution in glycol-monomethyl-ether of the diazo compound conforming to the Formula 5 and this layer is then thoroughly dried with warm air. The sensitized foil is exposed behind a transparent pattern for two minutes to the light emitted by an arc lamp of 18 amperes at a distance of 70 cm. The development is effected with a one-percent solution of phosphoric acid. Subsequent to its being inked with greasy ink, a positive image is obtained from a negative pattern and may be used for printing.

The diazo compound conforming to the Formula 5, N-(2′,4′-dichlorobenzene - sulfonyl) - imino - (1) - 2,5-diethoxy-benzoquinone - (1,4) - diazide - (4), is obtained analogously to the production method described in Example 1.

(3) A one-percent solution of the diazo compound conforming to the Formula 6 in glycol-monomethyl-ether, containing 0.1 percent of the dyestuff Eosin S (compare Schultz, "Farbstofftabellen," seventh edition, volume 1, page 375, No. 883), is applied to an anodically oxidized aluminum foil, and this layer is thoroughly dried. Subsequent to its exposure to light under a negative transparent pattern, the foil is developed with a three-percent solution of trisodium phosphate. There appears a positive image of the pattern colored slightly violet, which is wiped over with a one-percent solution of phosphoric acid and can then be inked with greasy ink. The foil prepared in this manner is suited to be used as a printing plate for the production of large editions.

The N-(benzene-sulfonyl)-imino-(1)-2,5-diethoxy-benzoquinone-(1,4)-diazide-(4) conforming to the Formula 6 is produced in accordance with the process described in Example 1.

(4) One part of the diazo compound conforming to the Formula 7 is dissolved in a hundred parts by volume of glycol-monomethyl-ether, and this solution is whirlcoated onto the mechanically roughened surface of an aluminum foil. After the layer side has been thoroughly dried, the foil is exposed to light under a negative transparent pattern and is then developed by wiping with a one-percent solution of trisodium phosphate. Then the image side of the foil is rinsed with water and is briefly wiped over with a one-percent solution of phosphoric acid. The positive image thus obtained can be inked with greasy ink and may be used for printing a large number of copies in a customary printing apparatus.

Equally good results are obtained with the diazo compounds conforming to the Formulas 8, 9 and 10. In developing the diazo compound conforming to the Formula 8 it is best to use a five-percent solution of trisodium phosphate, while the diazo compound conforming to the Formula 9 is developed with a 0.3-percent solution of trisodium phosphate.

The N-(4′-methyl-benzene-sulfonyl) - imino - (1) - 2-methoxy-5-methyl-benzoquinone-(1,4)-diazide - (4) conforming to the Formula 7 is prepared analogously to the method described in Example 1 by condensation of 1-amino-2-methyl-5-ethoxy-benzene with p-toluene - sulfochloride and by processing the intermediate product thus obtained according to the instructions given in the above-named example.

The diazo compound corresponding to Formula 8, the N-(4′-methylbenzene - 1′-sulfonyl)-imino - (1) - 2,5-dimethyl-benzoquinone-(1,4)-diazide-4, is prepared as follows:

Equimolecular quantities of 2-amino-p-xylene and p-toluene-sulfochloride are condensed in dioxane in the presence of pyridine. After recrystallization from alcohol the p-toluene-sulfonyl-amino - 2,5-dimethylbenzene thus obtained melts at 112° C. At 50° C. this compound is subsequently nitrated with 1.1 mol of concentrated nitric acid ($d$=1.52) in glacial acetic acid. The p-toluene-sulfonylamino-4-nitro-2,5-dimethyl-benzene is obtained which, after recrystallization from dioxane, melts at 183–184° C. By catalytical reduction of the nitro compound with hydrogen and colloidal nickel in an alcoholic solution and at a temperature of 80–100° C., the p-toluene-sulfonyl-amino-(1)-4-amino - 2,5 - dimethylbenzene is obtained. Diazotization of this compound is performed by means of sodium nitrite in a hydrochloric acid/dioxane solution. The solution of the diazonium salt formed is diluted with three times its own quantity of water, and then filtered with animal charcoal. By adding sodium acetate to the diazonium salt solution the imino-quinone-diazide of Formula 8 is precipitated.

The diazo compound corresponding to Formula 9, the N-(4′ - methyl - benzene - 1′ - sulfonyl)-imino - (1)-2-chlorobenzoquinone-(1,4)-diazide-4 is prepared as follows:

Equimolecular quantities of 2-chloro-aniline and p-toluene-sulfochloride are condensed in dioxane in the presence of pyridine. After recrystallization from alcohol the p-tuluene-sulfonyl-amino-2-chlorobenzene melts at 105° C. This compound is subsequently nitrated with 30% nitric acid (approximately 30%) in a boiling benzene solution. The p-toluene-sulfonyl-amino-4-nitro-2-chlorobenzene thus obtained melts at 164° C. after recrystallization from glacial acetic acid. By catalytically reducing this nitro compound with hydrogen and colloidal nickel in an alcoholic solution at 60–80° C., the p-toluene-sulfonyl-amino-(1)-4-amino-2 - chlorobenzene is obtained. By diazotization of this compound with sodium nitrite in glacial acetic acid the imino-quinone-diazide of Formula 8 precipitates suddenly in the form of green-yellow crystals.

The diazo compound corresponding to Formula 10, the N-(4′-methyl-benzene - 1′-sulfonyl) - imino - (1)-2-methyl - benzoquinone - (1,4) - diazide - 4 is prepared as follows:

Equimolecular quantities of 4-nitro-1-amino-2-toluene and p-toluene-sulfochloride are condensed in pyridine. After recrystallization from alcohol the p-toluene-sulfonyl-amino-4-nitro-2-toluene obtained melts at 174° C. By catalytically reducing this compound with hydrogen and colloidal nickel in an alcoholic solution at 60–80° C., the p-toluene-sulfonyl-amino - (1) - 4 - amino - 2 - toluene is obtained. Diazotization of this compound is performed with sodium nitrite in a hydrochloric acid/dioxane solution at room temperature. The solution of the diazonium salt formed is diluted with twice its own nuchared volume of water and filtered with animal charcoal. By adding solid sodium acetate to the solution of the diazonium salt the imino-quinone diazide is caused to precipitate.

(5) Two parts of the diazo compound conforming to the Formula 12 are dissolved in a hundred parts by volume of glycol-monomethyl-ether, and this solution is used for coating the mechanically roughened surface of an aluminum foil in the customary manner. The image produced by exposure to light under a pattern is developed by wiping over with a five-percent solution of phosphoric acid. From a negative pattern there is obtained a positive image which can be inked with greasy ink and can be used for printing in a printing machine.

In the place of the above-mentioned diazo compound, the diazo compound conforming to the Formula 13 can be used. The images produced with this compound are developed by means of a mixture of 7 parts by volume of glycol and 3 parts by volume of a one-percent solution of phosphoric acid.

The diazo compounds No. 12 and No. 13 are prepared analogously to the method described in Example 1.

(6) A one-percent solution of the diazo compound conforming to the Formula 14 in glycol-monomethyl-ether is applied in the customary manner to the mechanically roughened surface of an aluminum foil, and the image produced by exposing the coated material to light under a pattern is developed by means of a two-percent solution of trisodium phosphate. The developed foil is rinsed with water and is then treated with a one-percent solution of phosphoric acid; a positive image is thus obtained, if the pattern was a negative. The diazo compound conforming to the Formula 14 is produced by the condensation of 1-amino-hydroquinone-2,5-diethyl-ether with 4,4′-diphenyl-disulfo-chloride, by subsequent nitration of the condensation product, by alkaline reduction of the dinitro compound with sodium hydrosulfite at a temperature of from 70° to 80° C., and by diazotization of the bis-amino-compound under the conditions indicated in Example 1.

(7) One part of the diazo compound conforming to the Formula 15 is dissolved in a hundred parts by volume of glycol-monomethyl-ether, and this solution is used for coating an aluminum foil in the customary manner. After thorough drying, the foil is exposed to light behind a negative transparent pattern and developed by wiping with a five-percent solution of phosphoric acid. The positive, greenish-yellow image thus obtained can be inked with greasy ink, and the resulting printing plate can be used for producing copies in an apparatus customarily used in offset printing.

In order to prepare the diazo compound conforming to the Formula 15, p-acetamino-benzene-sulfochloride is first caused to react with 2-amino-hydroquinone-diethyl-ether. The condensation product obtained is then processed in accordance with the method described in Example 1 to form N-(4′-acetyl-amino-benzene-sulfonyl)-imino-(1)-2,5 - diethoxy-benzoquinone - (1,4) - diazide-(4) which melts at 150° C. under decomposition. This compound is saponified with concentrated hydrochloric acid at 0° C., and the solution of the saponification product is neutralized with sodium acetate. In this manner the imino-quinone-diazide of the Formula 15 is obtained.

(8) The solution of one part of the diazo compound conforming to the Formula 16 in a hundred parts by volume of glycol-monomethyl-ether is brushed onto an aluminum foil, the surface of which may be mechanically roughened. The light-sensitive foil is exposed to light under a negative pattern and is then developed with a solution consisting of fifty parts of calcium chloride, 130 parts by volume of ethyl alcohol, thirty parts by volume of water, and ten parts by volume of triethanolamine; the layer side is then rinsed with water and is subsequently treated briefly with a one-percent solution of phosphoric acid. Subsequent to its being inked with greasy ink, the positive image thus obtained can be used as a printing plate.

In preparing the diazo compound conforming to the Formula 16, N-(butyl-sulfonyl)-imino-(1)-2,5-diethoxy-benzoquinone-(1,4)-diazide-(4), the method described in detail in Example 1 is followed analogously.

(9) A one-percent solution of the diazo compound conforming to the Formula 17 in glycol-monomethyl-ether, containing 0.2 percent of the formaldehyde phenol novolak that is sold by the firm Chemische Werke Albert, Wiesbaden-Biebrich, under the name "Alnovol" (registered trademark in Germany) is applied in the customary manner to the roughened surface of an aluminum foil, and the thoroughly dried, light-sensitive foil is exposed to light under a negative pattern. The exposed foil is developed by being wiped over with a 15-percent solution of disodium phosphate and is then rinsed with water. The background of the image is treated with a one-percent solution of phosphoric acid a slight etching effect resulting therefrom and a lightly colored positive image on a clear metallic background is thus obtained.

The diazo compound conforming to the Formula 17 is produced by first causing equimolecular quantities of benzoxazolone-5-sulfo-chloride (obtainable from benzoxazolone-5-sulfo-acid with chlorosulfonic acid) and of pure amino-hydroquinone-dimethyl ether to react with each other in dioxane in the presence of pyridine. The resulting product is benzoxazolone-5′-sulfonyl-amino-2,5-dimethoxy-benzene, which, recrystallized from glacial acetic acid, melts at 230° to 233° C. This compound yields, when nitrated with 1.2 mols of concentrated nitric acid ($d=1.52$) in glacial acetic acid, benzoxazolone-5′-sulfonyl-amino-2,5-dimethoxyl-4-nitrobenzene, which melts at 235° to 236° C. From this nitro-compound there is obtained by catalytic reduction in alcohol with a nickel contact catalyst benzoxazolone-5′-sulfonyl-amino-2,5-dimethoxy-4-amino-benzene which is further processed by way of the method described in Example 1 to form the N-(benzoxalone-5′-sulfonyl)-imino-(1) - 2,5 - dimethoxy-benzoquinone-(1,4)-diazide-(4) conforming to the Formula 17.

(10) An aluminum foil is coated in similar manner as described in Example 9 with the solution of one part of the diazo compound conforming to the Formula 18 in a hundred parts by volume of glycol-monomethyl-ether. The layer side is dried thoroughly and is then exposed to an arc lamp for two minutes under a negative pattern; the image thus produced is wiped over with a developing solution prepared from a five-percent solution of phosphoric acid by mixing with glycol (2:8). The positive image obtained can then be inked with greasy ink and may be used for printing.

The same result is achieved by means of the diazo compound conforming to the Formula 19. In order to obtain the finished image, the exposed material is developed by wiping over it with a one-percent solution of trisodium phosphate and by wiping it briefly with a one-percent solution of phosphoric acid.

The diazo compound conforming to the Formula 18, N - (4' - methyl-benzene-sulphonyl)-imino-(1)-naphthoquinone-(1,4)-diazide-(4), is prepared by initially condensing p-toluene-sulfochloride with 1-naphthylamine. The nitration of the condensation product is performed at a temperature of 30° C. in a mixture of glacial acetic acid and dioxane by slowly adding concentrated nitric acid ($d=1.52$) drop by drop. The nitro compound is reduced catalytically in alcohol with colloidal nickel at a temperature of from 60° to 80° C. and the readily oxidizible corresponding amino compound forms. The diazotization of the base and the conversion of the diazonium compound into the diazide is performed in the manner described in Example 1.

1-benzoylimino-naphthoquinone-diazide-(4) conforming to the Formula 19 is prepared by diazotization of 1-benzoyl-amino-4-naphthylamine (Liebig's Annalen der Chemie, volume 208 (1881), page 326) with di-nitrogen-trioxide in an acetone solution (Morgan and collaborators, Journal of the Chemical Society of London, vol. 111 (1917), page 187, and vol. 113 (1918), page 588).

(11) An aluminum foil is coated in the customary manner with a solution of one part of the diazo compound conforming to the Formula 20 in a hundred parts by volume of dioxane. The sensitized foil is exposed to light under a pattern in the well-known manner and is then developed by wiping with a one-percent solution of phosphoric acid. After being inked with greasy ink the image thus produced is ready for printing. A positive image is obtained from a negative pattern.

1-benzoylimino - 2,5 - dimethoxy-benzoquinone-diazide-(4) conforming to the Formula 20 is prepared by following the method prescribed in Example 10 for the production of the compound conforming to the Formula 19.

(12) A one-percent solution of the diazo compound conforming to the Formula 21 in glycol-monomethyl-ether is applied to an aluminum foil. After being dried in a current of hot air, the light-sensitive foil is exposed to an arc lamp behind a negative transparent pattern. The development of the image thus produced (positive) is effected by wiping with a five-percent solution of phosphoric acid.

The diazo compound conforming to the Formula 21 is produced from the diazonium salt of 2-amino-carbazole by treating the latter with excess ammonia water (Morgan and collaborators, Journal of the Chemical Society of London, vol. 121 (1922), page 2712).

(13) An aluminum foil is coated, in the same manner as described in Example 12, with a one-percent solution of the diazo compound conforming to the Formula 22 in a mixture consisting of equal parts of dioxane and glycol-monomethyl-ether. After being thoroughly dried, the sensitized foil is exposed to light behind a negative pattern and is then bathed in a five-percent solution of trisodium phosphate. The image side of the foil is briefly wiped with a one-percent solution of phosphoric acid, and the image thus obtained, which is a positive reproduction of the master pattern, is inked with greasy ink.

In order to produce the diazo compound conforming to the Formula 22, 1-chloro-4-nitrobenzene-2-sulfochloride is condensed with 2 mols of aniline in a dioxane solution at a temperature of from 50° to 60° C. The resulting 1-chloro-4-nitrobenzene-2-sulfon-anilide is heated togther with excess aniline to the boiling point for about one hour, whereby 4-nitro-diphenyl-amine-2-sulfon-anilide is obtained, which melts at 162° C. The catalytic reduction of this compound with colloidal nickel in alcohol at a temperature of from 60° to 80° C. yelds 4-amino-diphenyl-amine-2-sulfon-anilide which is diazotized in the customary manner. By the addition of a large quantity of ammonia water, N-phenylimino-(1)-2-anilido-sulfonyl-benzoquinone-(1,4)-diazide-(4) is obtained from the diazo compound.

(14) A zinc plate is brushed for five minutes with a solution consisting of four parts of potassium aluminum sulfate and a hundred parts by volume of a four-percent solution of acetic acid, then it is rinsed with water and dried. The zinc plate pretreated in this manner is whirl-coated with a solution of 2 parts of the diazo compound conforming to the formula 23 in 100 parts by volume of glycol-monomethyl-ether, and after thorough drying the coated side of the sensitized material is exposed to light under a positive pattern. The exposed plate is carefully developed with a one-percent solution of disodium phosphate and there appears a slightly yellow-colored positive image of the positive pattern employed.

The diazo compound conforming to the Formula 23 is prepared by initially condensing 1 mole of 1,8-naphthsultam-4-sulfochloride (W. König, Berichte der deutschen chemischen Gesellschaft, 55th annual edition (1922), vol. II, page 2149) with 2 moles of N-ethyl-aniline in dioxane at a temperature of from 50° to 60° C. An amino group is introduced in the 2-position of the resulting 1,8-naphthsultam-4-sulfon-N-ethyl-anilide by coupling with diazobenzene in an ammoniacal solution of dioxane at 0° C. and by the reduction of the resulting azo dye with sodium hydrosulfite in a dilute solution of caustic soda at a temperature of from 70° to 80° C. The amino compound is diazotized in glacial acetic acid with a solution of sodium nitrite. The diazide precipitates in the form of a brownish-yellow body.

(15) A two-percent solution of the diazo compound conforming to the Formula 24 in glycol-monomethyl-ether is brushed onto the mechanically roughened surface of an aluminum foil and the coated side of the foil is thoroughly dried. The sensitized foil is exposed to light under a positive master pattern. Then it is developed by wiping with a one-percent solution of trisodium phosphate and is subsequently wiped briefly with a one-percent solution of phosphoric acid. The positive image thus produced shows great resistance to abrasion and can be used for printing when inked with greasy ink.

The diazo compound conforming to the Formula 24 is prepared analogously to the preparation of the diazo compound described in the previous example.

(16) In the same manner as described in the previous example, an aluminum foil is coated with a two-percent solution in dioxane of the diazo compound conforming to the Formula 25 and the thoroughly dried foil is exposed to light under a positive pattern. The exposed foil is developed with a 0.3-percent solution of trisodium phosphate (positive image) and is then treated with acid in the customary manner. The image can be inked with greasy ink and is then ready for printing.

The diazo compound conforming to the Formula 25 is produced from 2-amino-1,8-naphthsultam-4-sulfonyl-amido-(4')-diphenyl by following the method described in Example 14.

(17) To a paper foil of the kind described in Example 2 a solution of 2 parts of the diazo compound conforming to the Formula 26 in 100 parts by volume of glycol-mono-methyl-ether is applied, and the sensitized foil is exposed to light under a positive pattern. The exposed foil is developed with a ten-percent solution of disodium phosphate and then wiped over with a one-percent solution of phosphoric acid. The positive image thus produced, yellowish-brown on a slightly yellow background, can be inked with greasy ink and yields, when used for printing, copies free from background tone.

In order to produce the diazo compound conforming to the Formula 26, 2 moles of 1,8-naphthsultam-4-sulfo-chloride are caused to react with 1 mol of benzidine under the conditions mentioned in Example 14. The condensation product thus obtained is further processed in accordance with the working directions given for the compound conforming to the Formula 23.

(18) A one-percent solution of the diazo compound with the Formula 27 in glycol-monomethyl-ether is coated onto a roughened aluminum foil in the usual manner and then the coated side is freed from solvent by thorough drying. After the sensitized material has been exposed to light under an arc lamp behind a positive master the greenish-yellow image is developed with a five-percent solution of disodium phosphate. The image area is rinsed by a subsequent treatment of the developed foil with a solution containing 8% dextrin, 1% phosphoric acid and 1% formaldehyde. The positive image obtained can be inked with greasy ink and is then ready for printing.

The diazo compound conforming to Formula 27 is produced in the following manner: 1 mol of 1,8-naphthsultam-4-sulfochloride is added while stirring to a solution of 1 mol of phenol and 1 mol of pyridine in dioxane and the mixture is heated for 15–20 minutes to the boiling temperature of the solution. After cooling down the 1,8-naphthsultam-4-sulfo-acid-phenylester is precipitated from the solution with the aid of water and recrystallized from glacial acetic acid and water. The amino group is introduced into the 2-posiiton of this compound by coupling the sulfophenylester with diazotized p-nitroaniline in a dioxane solution in the presence of pyridine and by reducing the azo dyestuff obtained (melting point 285° C.) catalytically with the aid of Raney-nickel in alcoholic solution at room tempertaure. The p-phenylenediamine of the 1,8-naphthsultam-2-amino-4-sulfoacid-phenylester is decomposed by treatment with dilute acetic acid.

The amino compound which melts at about 168°–172° C. darkens quickly in the presence of air. It is diazotized in glacial acetic acid with the aid of a sodium nitrite solution. After adding water to the diazotizing mixture the iminoquinonediazide comes down as a brown-yellow precipitate. It melts at 10°–15° C. under decomposition.

Having described and fully explained the present invention, what is claimed is:

1. The process of photomechanical reproduction comprising the steps of coating a base sheet material selected from the group consisting of aluminum, zinc and papers coated with a mineral filler and adhesive, with a layer containing a compound selected from the group of imino-quinone-diazides of the general formulae:

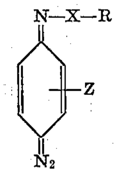

wherein:
R stands for aryl,
X stands for a member of the group consisting of $SO_2$ and CO,
Z stands for a member of the group consisting of alkyl and halogen,

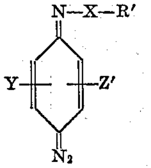

wherein:
R' stands for a member of the group consisting of aryl and alkyl,
X stands for a member of the group consisting of $SO_2$ and CO,
Y stands for a member of the group consisting of alkoxy and methyl where R' is aryl; Y is alkoxy where R' is alkyl,
Z' stands for a member of the group consisting of methyl, halogen and alkoxy where R' is aryl; Z' is alkoxy where R' is alkyl,

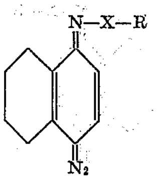

wherein:
R stands for aryl,
X stands for a member of the group consisting of $SO_2$ and CO, and

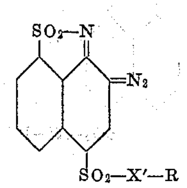

wherein:
R stands for aryl,
X' stands for a member of the group consisting of O,N-alkyl and NH, exposing said layer to a light image and developing the exposed layer with a developing agent selected from the group consisting of dilute alkaline substances, dilute acids, organic solvents and mixtures of organic solvents with water.

2. The process of claim 1 wherein the developed plate is thereafter swabbed with printing ink.

3. Light-sensitive material for photomechanical reproduction comprising a base of sheet material selected from the group consisting of aluminum, zinc and papers coated with a mineral filler and adhesive, and having a thin uniform light-sensitive layer coated thereon, said light-sensitive layer comprising a diazo compound selected from the group of imino-quinone-diazides of the general formulae:

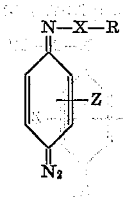

wherein:
R stands for aryl,
X stands for a member of the group consisting of $SO_2$ and CO,
Z stands for a member of the group consisting of alkyl and halogen,

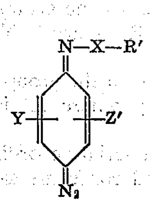

wherein:
R' stands for a member of the group consisting of aryl and alkyl,
X stands for a member of the group consisting of $SO_2$ and CO,
Y stands for a member of the group consisting of alkoxy and methyl where R' is aryl; Y is alkoxy where R' is alkyl, and Z′ stands for a member of the group consisting of methyl, halogen and alkoxy where R′ is aryl; Z′ is alkoxy where R′ is alkyl,

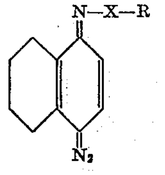

wherein:

R stands for aryl,

X stands for a member of the group consisting of $SO_2$ and CO; and

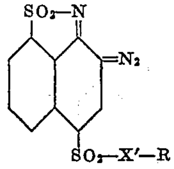

wherein:

R stands for aryl,

X′ stands for a member of the group consisting of O, N-alkyl and NH.

4. Light-sensitive material according to claim 3 wherein the diazo compound conforms to the general formula

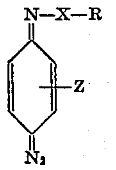

wherein:

R stands for aryl,

X stands for a member of the group consisting of $SO_2$ and CO, and

Z stands for a member of the group consisting of alkyl and halogen.

5. Light-sensitive material according to claim 3 wherein the diazo compound conforms to the general formula

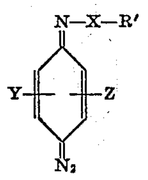

wherein:

R′ stands for a member of the group consisting of aryl and alkyl,

X stands for a member of the group consisting of $SO_2$ and CO,

Y stands for a member of the group consisting of alkoxy and methyl where R′ is aryl. Y is alkoxy where R′ is alkyl, and Z′ stands for a member of the group consisting of methyl, halogen and alkoxy where R′ is aryl; Z′ is alkoxy where R′ is alkyl.

6. Light-sensitive material according to claim 3 wherein the diazo compound conforms to the general formula

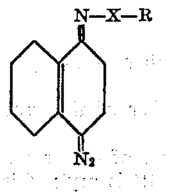

wherein:

R stands for aryl, and

X stands for a member of the group consisting of $SO_2$ and CO.

7. Light-sensitive material according to claim 3 wherein the diazo compound conforms to the general formula

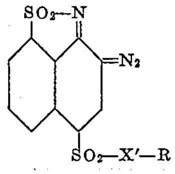

wherein:

R stands for aryl, and

X′ stands for a member of the group consisting of O, N-alkyl and NH.

8. Light sensitive material for photomechanical reproduction comprising a base material and a thin uniform light sensitive layer coated thereon, said light sensitive layer comprising the diazo compound of the formula:

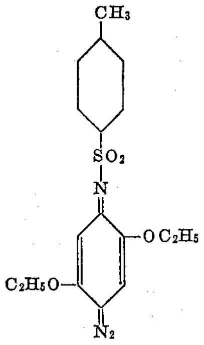

9. Light sensitive material for photomechanical reproduction comprising a base material and a thin uniform light sensitive layer coated thereon, said light sensitive layer comprising the diazo compound of the formula:

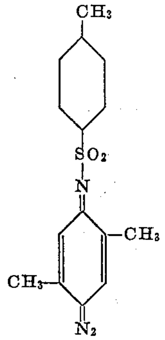

10. Light sensitive material for photomechanical reproduction comprising a base material and a thin uniform light sensitive layer coated thereon, said light sensitive layer comprising the diazo compound of the formula:

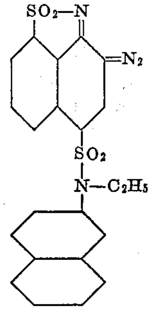

11. Light sensitive material for photomechanical reproduction comprising a base material and a thin uniform light sensitive layer coated thereon, said light sensitive layer comprising the diazo compound of the formula:

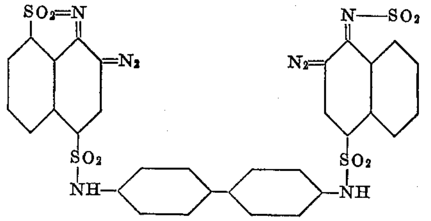

12. Light sensitive material for photomechanical reproduction comprising a base material and a thin uniform light sensitive layer coated thereon, said light sensitive layer comprising the diazo compound of the formula:

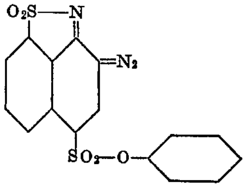

References Cited in the file of this patent

UNITED STATES PATENTS

| | | |
|---|---|---|
| 2,649,373 | Neugebauer et al. | Aug. 18, 1953 |

FOREIGN PATENTS

| | | |
|---|---|---|
| 607,870 | Germany | Jan. 10, 1935 |
| 904,255 | France | Feb. 19, 1945 |

OTHER REFERENCES

Saunders: The Aromatic Diazo Compounds, Pub. Edward Arnold and Co., London, 1949 (2nd edition), pages 36 to 38. (Copy in S. L.)

Morgan et al.: "Journal of the Chemical Society of London," vol. 121 (1922), page 2712; vol. 111 (1917), page 187; and vol. 113 (1918), page 588.